United States Patent [19]

Seeney et al.

[11] 4,389,498
[45] Jun. 21, 1983

[54] OXIDATIVELY COUPLED COLD-SET BINDERS

[75] Inventors: Charles E. Seeney, Brazil; John F. Kraemer, Terre Haute, both of Ind.; Nancy C. Varnum, Kingsville, Mo.

[73] Assignee: International Minerals & Chemical Corp., Terre Haute, Ind.

[21] Appl. No.: 411,201

[22] Filed: Aug. 25, 1982

Related U.S. Application Data

[62] Division of Ser. No. 283,718, Jul. 16, 1981.

[51] Int. Cl.$^3$ .............................................. C08L 49/00
[52] U.S. Cl. .................................... 523/139; 523/141; 524/849; 524/855
[58] Field of Search .......................... 526/285; 164/21; 523/139, 140, 141; 524/849, 855

[56] References Cited

U.S. PATENT DOCUMENTS 2,632,749 3/1953 Kaufman et al. .................... 524/855
4,144,215 3/1979 Khachaturian ...................... 523/139

FOREIGN PATENT DOCUMENTS 2072197 9/1981 United Kingdom ................ 524/855

Primary Examiner—Lewis T. Jacobs
Attorney, Agent, or Firm—Robert H. Dewey

[57] ABSTRACT

A foundry composition adaptable to forming cores and molds comprising a foundry aggregate, a binder therefor, a catalyst and an amine, the binder being a substituted phenol.

17 Claims, No Drawings

OXIDATIVELY COUPLED COLD-SET BINDERS

This is a division of copending application Ser. No. 283,718, filed July 16, 1981.

BACKGROUND OF THE INVENTION

This invention relates to rapid cold-set binders. In a particular aspect, this invention relates to a foundry composition characterized by rapid setting at room temperature.

Cores useful in making metal castings are customarily made by placing a foundry aggregate, usually silica sand which has been admixed with a suitable binder, against a shape or pattern and then hardening the binder, as by polymerization. The resulting core is a self-supporting structure which forms a part of a mold assembly.

Various sands are used for making cores. The cores themselves are made by a variety of processes employing a wide variety of binders. Three of the many processes in commercial use today are the so-called cold box process, no-bake process and the rapid no-bake process.

The cold box process is one in which sand is admixed with a suitable resinous binder composition; the mixture is blown into a core box, and is then gassed with a suitable vapor phase catalyst to cure the binder. By such process, which is described, for example, in U.S. Pat. No. 3,409,579, a core of sufficient hardness to be stripped from the core box is produced in a matter of seconds.

The no-bake process is one in which a resinous core binder is admixed with a catalyst and sand and the mixture placed in a core box. The core cures at ambient temperatures but much more slowly than in the cold box process, over a period of hours or even days. After a suitable period of time, such as two hours, the core can generally be stripped from the core box, but requires further cure time.

The rapid no-bake process is similar to the no-bake process, but the character of the resin and the amount and type of catalyst employed are such that a core is formed and may be stripped from the core box in a matter of a few minutes. The bench life, or time period during which a sand-resin mixture may be kept before the reaction proceeds to a detrimental extent prior to placing the mixture into the core box, generally decreases rapidly when the catalyst and resin are adjusted to provide very rapid set times.

These processes have been very successful. However, those wherein isocyanates are used are unsatisfactory in that they become air pollutants in the work area and can cause severe problems in industrial hygiene. Accordingly, a need exists for a non-polluting foundry aggregate composition.

SUMMARY OF THE INVENTION

It is an object of this invention to provide a foundry composition adapted to forming cores and molds.

It is another object of this invention to provide a foundry composition of an aggregate and a binder therefor, which is characterized by rapid setting at room temperature.

It is another object of this invention to provide a foundry composition of a foundry aggregate and a binder therefor which can be cured without polluting the environment.

It is the discovery of this invention to provide a foundry composition, and a process for the preparation thereof. The composition, which is adapted to forming cores and molds, comprises an aggregate, a polymerizable binder therefor, an amine and a catalyst. The binder is provided by a disubstituted phenol, a diacetylene or an ortho-substituted phenol-formaldehyde resin, all of which are polymerizable by contact with oxygen.

DETAILED DISCUSSION

It is known that many aromatic compounds undergo oxidative coupling and polymerization in the presence of, e.g. cuprous chloride and pyridine. A review of the chemistry involved is given by Allan S. Hay, Polymer Engineering and Science, January, 1976, pages 1-9. However, few of these polymers were of commercial interest.

It is the discovery of this invention to prepare foundry compositions employing monomers or polymers which can undergo oxidative coupling. The monomer or polymer is mixed with an amine and the catalyst. The pH is adjusted to between 6 and 9, preferably 7-8 and then applied to a foundry aggregate, such as sand. The mixture is then placed in a core or mold box and gassed with an oxygen source, whereupon oxidative coupling takes place and produces a useable core or mold for metal casting.

The polymerizable binder of this invention includes 2,6-disubstituted phenols; diacetylenes; ortho-substituted phenol-formaldehyde resins.

The 2,6-disubstituted phenols include but are not limited to compounds represented by the formula:

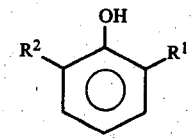

where $R^1$ and $R^2$ can be lower alkyl, e.g. alkyl of from 1-4 carbon atoms, methoxy, halide or phenyl and can be the same or different.

The diacetylenes useful in the practice of this invention include but are not limited to such compounds as meta or paradiethynylbenzene and the dipropargyl ether of bisphenol A.

The phenol-formaldehyde resins are known in the art. They include but are not limited to (a) resin prepolymers obtained by reacting phenol and an aldehyde in a mole ratio of from 1 to 1-2.3 in the presence of catalytic amounts of organic derivatives of aluminum, titanium or zirconium as disclosed by C. E. Seeney and J. F. Kraemer in pending U.S. patent application Ser. No. 139,304 filed Apr. 14, 1980, now U.S. Pat. No. 4,311,619, issued Jan. 19, 1982, which is incorporated herein by reference thereto, (b) ortho-benzylic ether resins disclosed, e.g. by Robins in U.S. Pat. No. 3,726,867, which is incorporated herein by reference thereto, (c) ortho-substituted novolac resins, also disclosed by Robins. The latter can be prepared using catalysts containing lead or zinc salts and a mole ratio of formaldehyde to phenol of 0.6-0.9.

Amines useful in the practice of this invention include but are not limited to tertiary amines such as pyridine and substituted pyridine, e.g. 2-(2-dimethylamino)ethylpyridine; 4,4-trimethylenepyridine and aliphatic tertiary amines, e.g. N,N,N',N'-tetramethylethylene diamine and N,N,N',N'-tetramethyl-1,3-butanediamine. The amines are used in an amount of about 1.5 to 30% based on the weight of the polymerizable binder formulation, preferably about 18%.

Catalysts useful in the practice of this invention include but are not limited to salts of lead and manganese, e.g. the dioxides, cobalt II salts, e.g. cobaltous chloride or acetate, and preferably cuprous salts, e.g. cuprous halides, the acetate, the sulfate and cuprous oxide. Cuprous chloride is the preferred catalyst. The amount of catalyst used in proportion to the amine is variable, depending somewhat on the particular amine and the particular catalyst, also the rate of cure desired. Generally a mole ratio of 1–20 parts or more of amine per part of catalyst is effective. Generally the greater the amount of catalyst, the faster the cure time, but if the cure time is too rapid, the binding action of the resin on the aggregate may be weaker than that at a slower rate of cure.

The gas used to oxidatively couple the resin system can be air, oxygen or a mixture of either of these with ozone. The amount of gas required varies with the amount of catalyst and the flow rate of gas through the coated aggregate. The preferred gas is oxygen.

According to the process of this invention, the polymerizable binder is used in an amount of about 0.1–10.0 parts per 100 parts of aggregate, preferably about 1–3 parts per 100. The binder is preferably dissolved in a solvent, many of which are known, e.g. aromatic hydrocarbons, and any solvent can also be used in the practice of this invention. The amine also is preferably dissolved in the solvent along with the binder. In fact, the amine, if liquid, e.g. pyridine, can constitute a portion of the solvent. A typical solvent-amine mixture is comprised of about one third pyridine and two-thirds toluene and the polymerizable binder is present in a concentration of about 50% by weight.

The invention will be better understood by reference to the following examples. It is understood, however, that these examples are intended only to illustrate the invention and it is not intended that the invention be limited thereby.

EXAMPLE 1

2,6-Dimethylphenol (DMP) 7.5 g was dissolved in 7.5 ml of a 2:1 mixture of toluene and pyridine. Then 0.28 g of cuprous chloride was added to the mixture and the resulting solution was quickly mixed with 750 g of Oregon 520 using a Hobart N-50 mixer at speed 2 for one minute. The coated sand was blown into a "dogbone" tensile mold of a core blower machine using compressed air at 80 psi. The coated sand was gassed with oxygen until firm (10 minutes required). The tensile strength was measured by breaking the core on a suitable machine. It was 50 psi.

EXAMPLE 2

DMP 5 g was dissolved in 5 ml of a 2:1 mixture of toluene and pyridine. Cuprous chloride 0.2 g was added, and the pH was adjusted to within the range of 5–10 in increments of one pH unit using potassium hydroxide or hydrochloric acid. The mixture was coated onto 500 l g Oregon 520 silica sand by mixing in a Hobart N-50 mixer at speed 2 for one minute. The coated sand was packed in a fritted glass Buchner funnel and gassed with oxygen at about 17 L/minute flow rate. The sand was probed with a Dietert 454B mold strength tester at 30 second intervals until a reading of 50 psi was obtained. The results, recorded in Table I, indicate that the maximum cure rate is obtained at 8 pH.

TABLE I

| Cure Rates of DMP vs pH | | |
|---|---|---|
| | pH | Time to Cure (min) |
| 1 | 5 | No cure (15 min) |
| 2 | 6 | 17.5 |
| 3 | 7 | 5 |
| 4 | 8 | 3.5–4 |
| 5 | 9 | 8 |
| 6 | 10 | No cure (15 min) |

EXAMPLE 3

The experiment of Example 1 was repeated in all essential details except that a mixture of equal parts 2,6-dimethylphenol (DMP) and a novolac resin were substituted for the DMP. After gassing with oxygen and allowing to stand overnight, the tensile strength was 25 psi.

EXAMPLE 4

The experiment of Example 1 was repeated in all essential details except that 5 g of 2,6-dimethylphenol was dissolved in 5 ml of a 2:1 mixture of linseed oil and pyridine. Cuprous chloride 0.2 g was added, and the mixture was coated onto 500 g of Oregon 520 sand and placed in a mold. The mixture was cured by gassing for 10 minutes with oxygen. After standing overnight the tensile strength was 35 psi.

EXAMPLE 5

The experiment of Example 1 was repeated in all essential details except that 5 g of 2,6-dimethylphenol was dissolved in 5 ml of a 2:1 mixture of aromatic hydrocarbon and 4-(3-phenylpropyl)pyridine. Cuprous chloride 0.2 g was added. The mixture was coated onto sand. After standing overnight, the tensile strength was 40 psi.

EXAMPLE 6

The experiment of Example 1 was repeated in all essential details except that 5 g of 2,6-dimethylphenol was dissolved in 5 ml of a 2:1 mixture of vinyl acetate and pyridine and 0.2 g cuprous chloride was added. The mixture was coated onto 500 g Oregon 520 sand, and the coated sand was packed into a dogbone tensile mold. After air curing overnight, the tensile strength was 14 psi.

We claim:

1. A foundry composition adaptable to forming cores and molds comprising a foundry aggregate, a polymerizable binder therefor, an amine and a metal salt catalyst, the binder being a diacetylene compound resin.

2. A process for preparing foundry cores and molds comprising the steps of (a) mixing a foundry aggregate with a polymerizable binder of claim 1, a metal salt catalyst therefor and an amine; (b) placing the mixture in a mold or core box and (c) passing an oxygen source through the mixture to effect oxidative polymerization of the binder and (d) removing the core or mold from the core box or mold.

3. The composition of claim 1 wherein the binder is meta- or paradiethynylbenzene or the dipropargyl ether of bisphenol A.

4. The composition of claim 1 wherein the binder is used in a ratio of about 0.1 to 10.0 parts per 100 parts of aggregate.

5. The composition of claim 1 wherein the binder is used in a ratio of about 1-3 parts per 100 parts of aggregate.

6. The composition of claim 1 wherein the amine is a tertiary amine.

7. The composition of claim 6 wheein the amine is a pyridine.

8. The composition of claim 6 wherein the amine is a substituted pyridine.

9. The composition of claim 8 wherein the amine is 2-(2-dimethylamino)ethylpyridine.

10. The composition of claim 8 wherein the amine is 4,4-trimethylenepyridine.

11. The composition of claim 6 wherein the amine is N,N,N',N'-tetramethylethylenediamine.

12. The composition of claim 6 wherein the amine is N,N,N',N'-tetramethyl-1,3-butanediamine.

13. The composition of claim 6 wherein the amine is used in an amount of about 1.5 to 30% based on the weight of the polymerizable binder formulation.

14. The composition of claim 13 wherein the amine is used in an amount of about 18%.

15. The composition of claim 1 wherein the metal salt catalyst is a salt of lead, manganese, cobalt II, or copper I.

16. The composition of claim 1 wherein the salt is a cuprous halide, cuprous acetate, cuprous sulfate or cuprous oxide.

17. The composition of claim 1 wherein the catalyst is present in a mole of 1 to 1-20 parts of amine.

* * * * *

UNITED STATES PATENT AND TRADEMARK OFFICE
CERTIFICATE OF CORRECTION

PATENT NO. : 4,389,498
DATED : June 21, 1983
INVENTOR(S) : Charles E. Seeney et al It is certified that error appears in the above-identified patent and that said Letters Patent are hereby corrected as shown below:

Column 3, line 63, "500 1 g" should read -- 500 g --

Column 5, Claim 7, line 1, "wheein" should read -- wherein --

Signed and Sealed this

Fifteenth Day of November 1983

[SEAL]

Attest:

GERALD J. MOSSINGHOFF

Attesting Officer    Commissioner of Patents and Trademarks